Aug. 19, 1969     R. D. RUMSEY     3,462,136
TUNED VISCOUS VIBRATION DAMPERS
Filed June 29, 1967     6 Sheets-Sheet 1
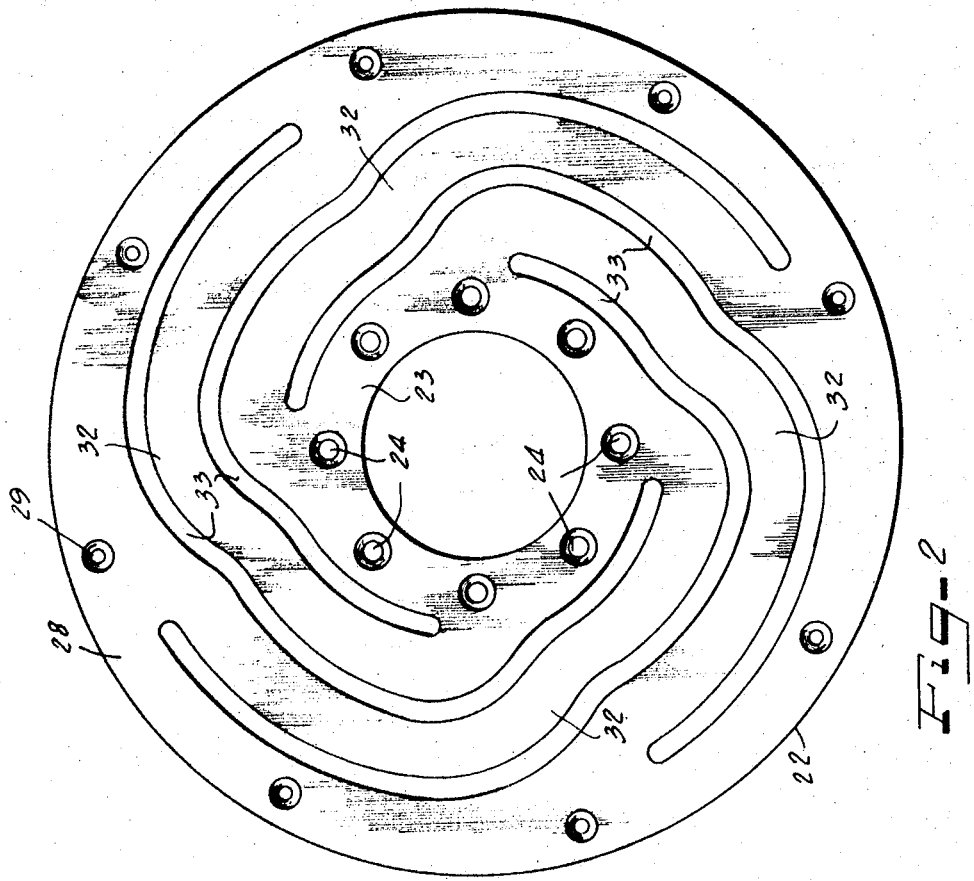
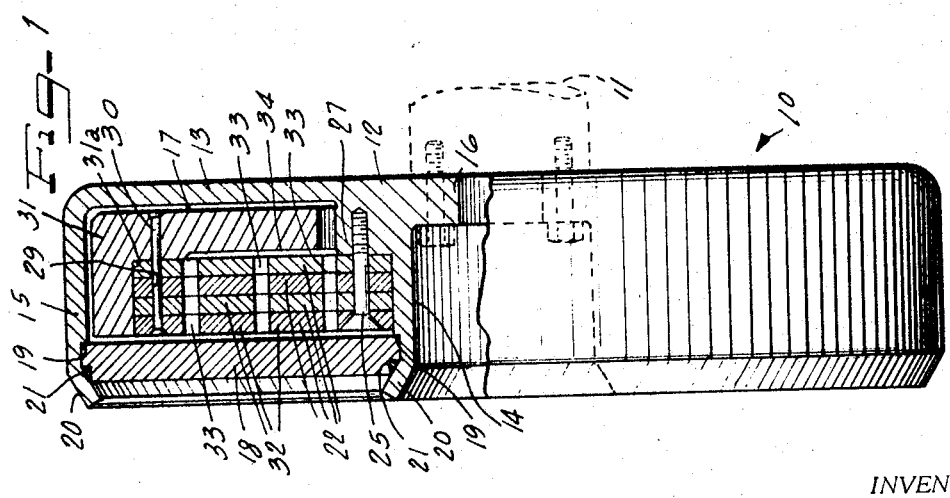
INVENTOR.
ROLLIN DOUGLAS RUMSEY
BY Hill, Sherman, Meroni, Gross & Simpson
ATTORNEYS Aug. 19, 1969 — R. D. RUMSEY — 3,462,136
TUNED VISCOUS VIBRATION DAMPERS
Filed June 29, 1967 — 6 Sheets-Sheet 2
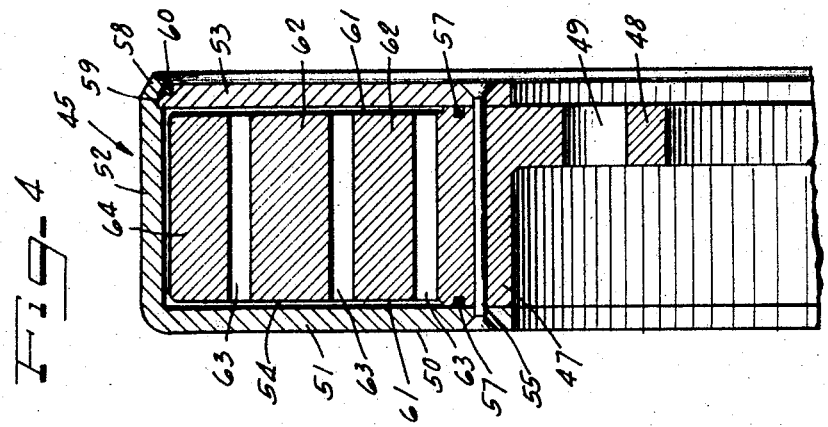
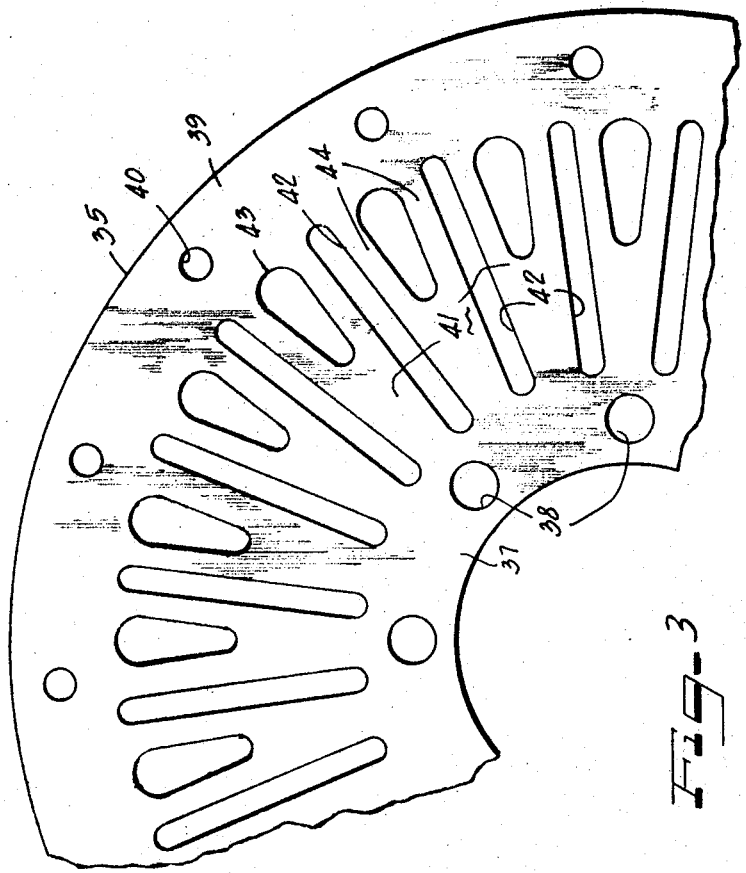
INVENTOR.
ROLLIN DOUGLAS RUMSEY
ATTORNEYS Aug. 19, 1969  R. D. RUMSEY  3,462,136
TUNED VISCOUS VIBRATION DAMPERS
Filed June 29, 1967  6 Sheets-Sheet 3
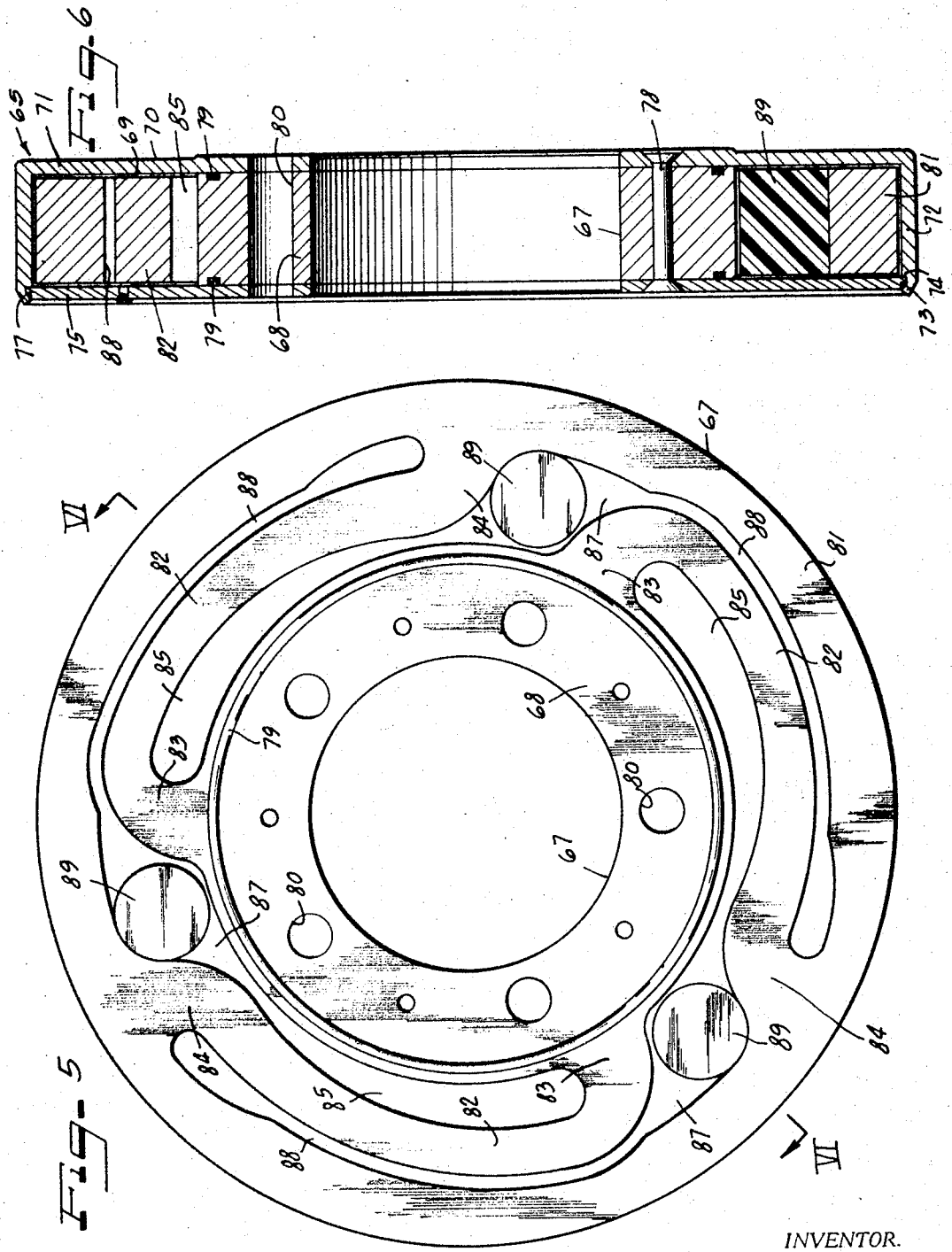
INVENTOR.
ROLLIN DOUGLAS RUMSEY
Hill, Sherman, Meroni, Gross & Simpson
BY  ATTORNEYS Aug. 19, 1969     R. D. RUMSEY     3,462,136
TUNED VISCOUS VIBRATION DAMPERS
Filed June 29, 1967     6 Sheets-Sheet 4
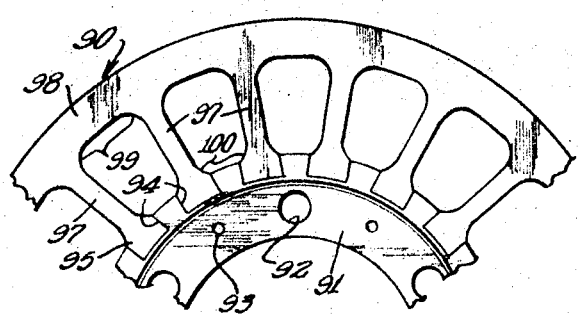
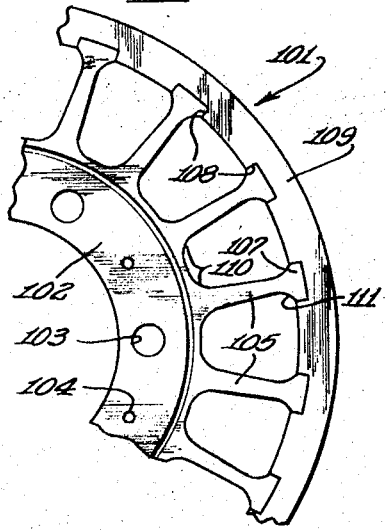
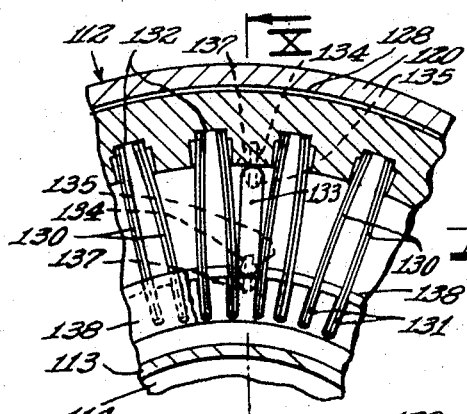
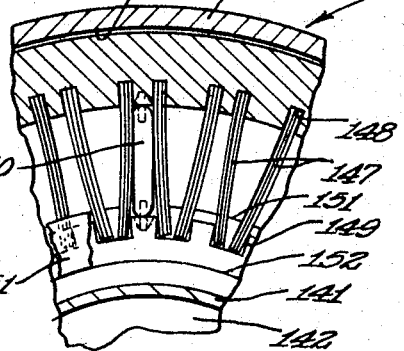
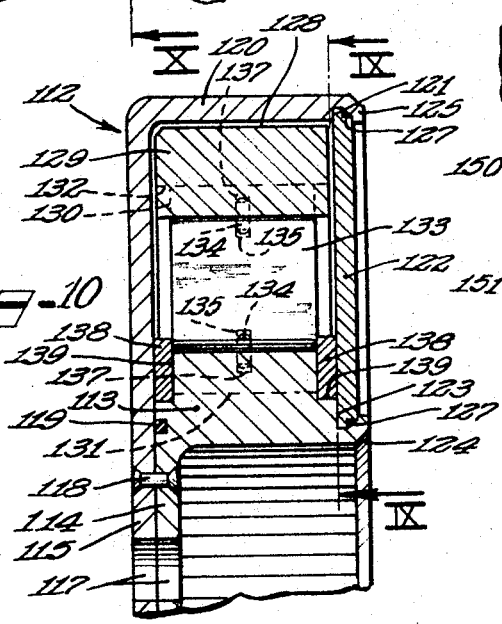
INVENTOR.
ROLLIN DOUGLAS RUMSEY
BY Hill, Sherman, Meroni, Gross & Simpson
ATTORNEYS

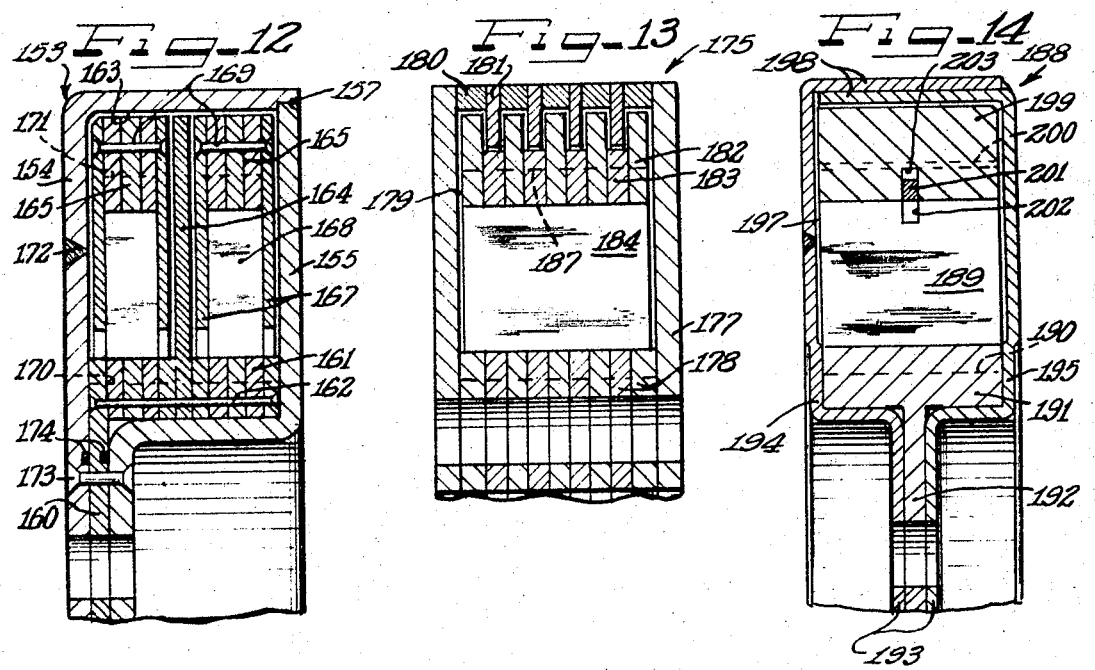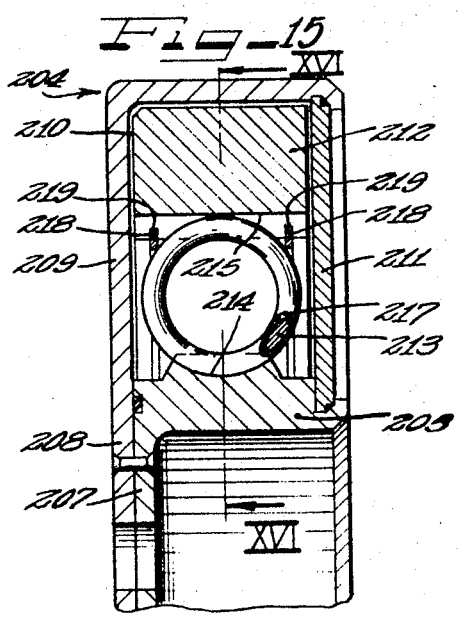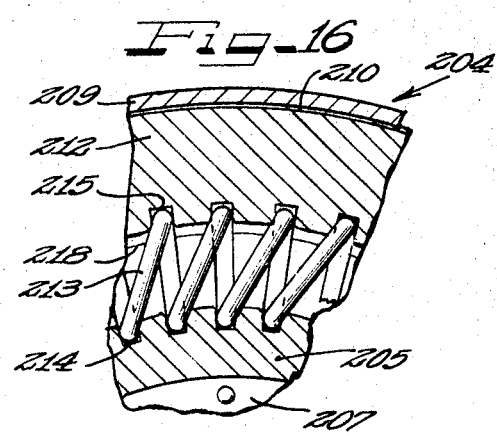

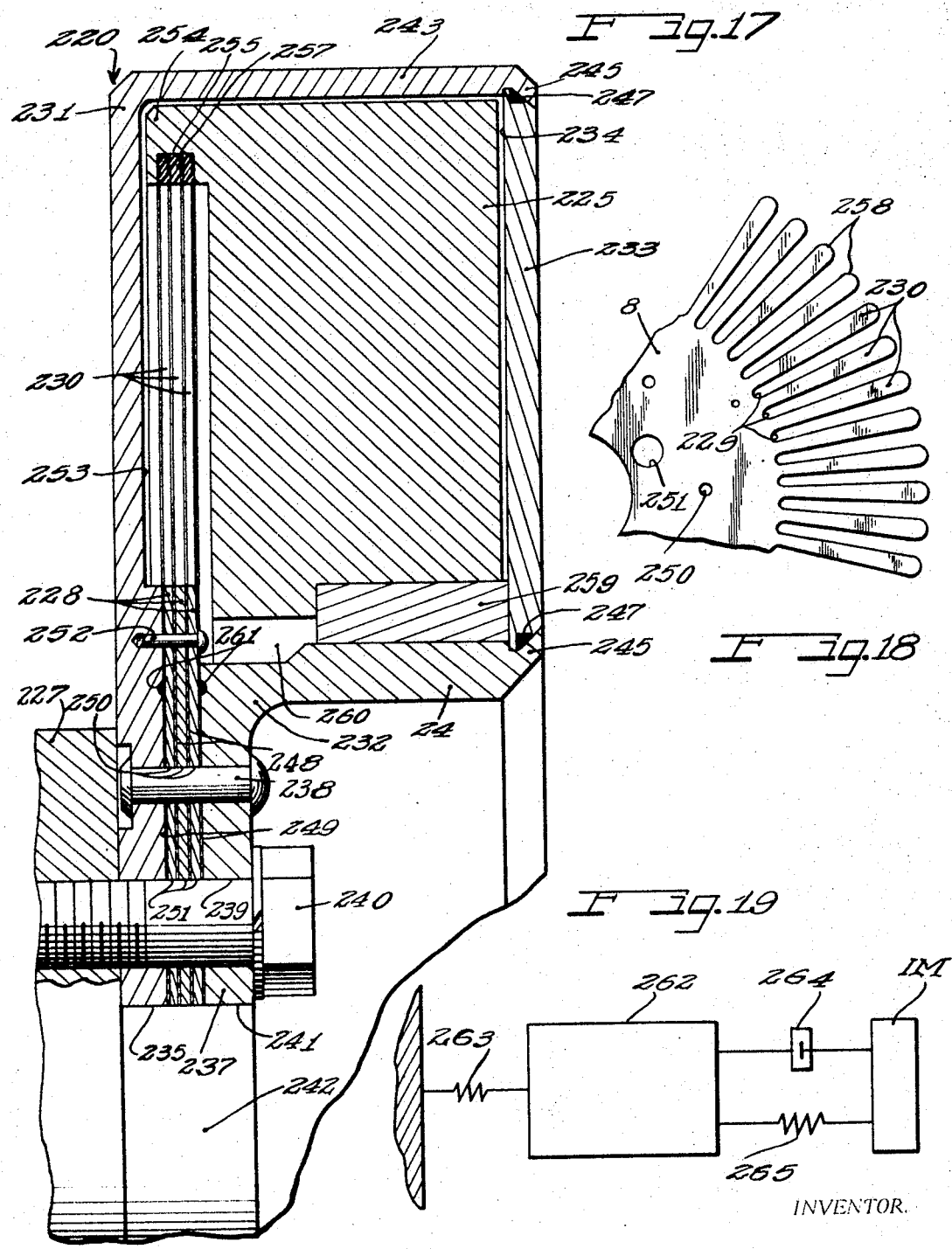

United States Patent Office 3,462,136
Patented Aug. 19, 1969

3,462,136
TUNED VISCOUS VIBRATION DAMPERS
Rollin Douglas Rumsey, Buffalo, N.Y., assignor to Houdaille Industries, Inc., Buffalo, N.Y., a corporation of Michigan
Filed June 29, 1967, Ser. No. 650,017
Int. Cl. B60g *11/18;* F16f *1/14;* F16d *57/00*
U.S. Cl. 267—1                                             24 Claims

ABSTRACT OF THE DISCLOSURE

Resilient spokes connect an inertia mass to the hub of a housing defining a working chamber thereabout to enable energy absorbing relative oscillatory motion of the mass in the housing, the oscillations being resisted by a viscous damping medium coupling between confronting shear film spaced parallel surfaces of the housing and the inertia mass.

---

This invention relates to vibration dampers, and is more particularly concerned with novel tuned viscous vibration damper constructions.

Certain problems have been present in prior tuned damper constructions and which problems are overcome by the present invention. For example, rubber springs have been employed between the inertia mass and the member subject to vibrations to be damped, but rubber suffers from short life due to high temperatures generated in the rubber, especially under severe and heavy duty practical applications, such as in automotive diesel engine damping. The rubber also changes tuning frequency as a function of temperature, hence must be tuned at a best compromise frequency due to this variation.

In another form of prior damper a resilient quill shaft spring has been utilized to connect the inertia mass to the vibratory member to be damped, but that requires space which is often not available.

Another form of prior tuned damper has utilized a viscous damping medium with tuning effected in the housing design, such as adjustable spacing. A problem encountered with this type of damper is that, similarly as with rubber, temperature variables occur, because the viscous damping fluid changes viscosity with temperature.

A continuing need has been present for a tuned damper which will lend itself to quantitative data and practical economic engineering feasibility. One such use for such a damper is in damping engine torsional amplitudes in which the tuning will break up the engine critical peak (e.g., 6th or 3rd order) into two separate peaks, one of higher and one of lower frequency. If the lower frequency peak is made the smaller by undertuning, the higher frequency higher peak can usually be located above the engine maximum speed range. This need is met by the present invention.

Accordingly, it is an important object of the present invention to attain the desirable advantages of a tuned viscous vibration damper without the problems inherent in the prior forms of damper.

Another object of the invention is to provide an improved form of tuned viscous damper that will have its tuning frequency unaffected by temperature, will be of extremely long life, and will be inexpensive to manufacture.

A further object of the invention is to provide a novel tuned viscous vibration damper which will, in a compact, efficient manner take advantage of both mechanical spring damping and viscous shear film damping in the same unit.

Still another object of the invention is to provide in a viscous torsional vibration damper a novel combination flywheel inertia mass and tuning spring structure.

Yet another object of the invention is to provide a viscous torsional vibration damper in which the material of the flywheel itself serves as an energy absorbing tuning medium.

It is also an object of the invention to provide a new and improved tuned viscous damper in which there is no internal wear since rubbing parts are eliminated whereby to attain the several advantages of avoiding deterioration of silicone damping fluid, enabling larger clearances to be employed with resultant cost savings, enabling use of parts with less surface finishing than heretofore since bearing wear is eliminated, and avoiding any need for plating or surface coating of wear parts or use of different materials to avoid seizing in the presence of silicone fluid.

Other objects, features and advantages of the present invention will be readily apparent from the following detailed description of certain preferred embodiments thereof taken in conjunction with the accompanying drawings, in which:

FIGURE 1 is a side elevational view, partially in section, of a damper embodying features of the invention;

FIGURE 2 is a face view of one of the stack of spring inertia discs of the damper of FIGURE 1;

FIGURE 3 is a fragmentary face view of a modified form of the inertia mass spring disc structure;

FIGURE 4 is a fragmentary radial sectional detail view through a damper embodying principles of the invention and showing a modification;

FIGURE 5 is a face view of another modified spoked inertia mass member for a damper according to principles of the invention;

FIGURE 6 is a sectional detail view through a damper embodying the inertia mass of, and taken substantially along the line VI—VI of FIGURE 5;

FIGURE 7 is a fragmentary side elevational view of a modified spoked inertia mass member;

FIGURE 8 is a fragmentary side elevational view of still another modified spoked inertia mass member;

FIGURE 9 shows yet another modification and is taken substantially on the line IX—IX of FIGURE 10;

FIGURE 10 is a radial sectional detail view taken substantially along the line X—X of FIGURE 9;

FIGURE 11 is a view similar to FIGURE 9 and shows a modified arrangement of the spokes;

FIGURES 12, 13, 14 and 15 are generally radial sectional detail views through additional modifications;

FIG. 16 is a fragmentary sectional detail view taken substantially along the line XVI—XVI on FIGURE 15;

FIGURE 17 is a fragmentary radial sectional detail view through another modified damper embodying features of the invention;

FIGURE 18 is a fragmentary face elevational view of a spring damping plate employed in the damper of FIGURE 17; and FIGURE 19 is a schematic illustration or analog of a damper system embodying the invention.

Representative of a family of dampers according to principles of the present invention is that depicted in FIGURES 1 and 2 comprising a tuned viscous torsional vibration damper 10 which is adapted to be mounted concentrically on the end of a shaft 11 subject to torsional vibrations, such as the crankshaft of an internal combustion engine, for example, a diesel engine. This damper comprises a housing member 12 which may be a machined casting provided with an annular axially opening channel shaped portion provided with a radial wall 13, radially spaced inner and outer annular axially extending coextensive walls 14 and 15, respectively, with a radially inwardly extending annular attachment flange 16 providing means for attachment of the damper to the shaft 11. Within the housing walls is defined an annular working chamber 17 which is closed at the open end of the casing by a closure disc 18 held in place in known manner on shoulders 19 by turned over retaining flanges on the adjacent ends of the axially extending walls 14 and 15 and hermetically sealing the working chamber 17 by clamping sealing material 21 in the joint.

Within the working chamber 17 is housed inertia mass means having at least a major portion thereof in the chamber. In this instance such means comprise a build-up flywheel structure including a stacked assembly of concentrically laminated spring discs 22 made from suitable heavy gauge material which can conveniently be die stamped at low cost. Suitable grade steel stock or a suitable non-metallic material such as nylon or fiberglass laminate may be used for this purpose. Each of the spring flywheel discs has a centrally apertured hub portion 23 having therein an annular series of spaced attachment perforations 24 through minimum stress points thereof through which suitable attaching means such as screws 25 extend to anchor the laminas concentrically about the inner axial wall 14 and against an annular internal stepped shoulder 27 providing a thickening reinforcement at juncture of the housing casing walls 13 and 14 and the attachment flange 16. A major portion of the laminar assembly extends radially outwardly beyond the shoulder 27 into the chamber 17 and each of the discs 22 has a continuous annular outer marginal rim 28 through which extends an annular series of circumferentially spaced apertures 29, aligned in the laminas, and receptive of respective rivets 30 by means of which an inertia member 31 is secured to the laminar structure. This inertia member is desirably in the form of an annular casting or forging of generally L-shaped axial cross section provided with an annular rabbet groove 31a complementally receptive of the supporting disc laminas. In this manner a substantial portion of the inertia ring 31 is disposed as a inertia rim about the discs and within the space between the radial wall 13 and the innermost of the discs 22 about the shoulder 27, affording efficient flywheel modulus. An advantage of this arrangement is that the inertia mass is adapted to be physically balanced in relation to the housing and will remain in balance, as contrasted to dampers in which the inertia mass is freely rotatably mounted within the housing and in which balance accuracy is dependent on the bearing clearance.

A substantial portion of the weight of the inertia mass is converted into energy-absorbing spring structure by means of resilient spokes 32 which connect the minor portion of the mass, namely, the hubs 23, and the inertia portion of the mass, namely the margins 28 and member 31, whereby to afford predeterminable, tuned spring damping. These spokes are formed by machining or stamping complementary dead ended slots 33 in the respective discs 22. In this instance, four of the spokes 32 have been provided which are of generally involute form providing constant strength canilever beams varying parabolically in depth in the radial direction of the disc from each end to the center and are anchored integrally at both ends. On their radial edges, the spokes 32 are shaped according to two respective parabolic variations, resulting in the spokes being of shallowest depth at the substantially midlength thereof and of deepest dimension at each end. This affords substantially constant bending stress throughout the length of the spokes in operation. Although fewer or more of the spokes may be utilized, depending on size and other considerations in the damper, in the illustrated form the spokes are of 140° in length with about 50° overlap of each spoke with its immediate neighbors. Various desirable tuning characteristics are attainable by suitable variations in length, depth, width, material, and the like, to meet known or anticipated damping requirements. In the assembly, any preferred relative orientation of the spokes of the several discs 22 may be effected, being indicated illustratively as coextensive and with the slots 33 in matching relation. As a result of the spaced resilient spoke construction of the intermediate portion of the damper disc structure, the inertia portion of the flywheel mass is adapted to oscillate relative to the housing 12 by limited bending of the spokes responsive to torsional vibrations and damping energy is absorbed and dissipated by hysteresis damping within the material of the inertia mass itself without exceeding the fatigue limit of the material.

In addition to the mechanical damping afforded by the spokes 32, viscous damping is provided for within the working chamber 17 by having the surfaces of the housing walls 13 and 15 as well as of the cover 18 in confronting parallel relation to the surfaces of respectively the inertia member 31 and of the outermost of the discs 22 in shear film spaced relation having regard to the viscosity of a damping medium substantially filling available space in the working chamber. Such viscous medium is desirably a silicone fluid of the desired viscosity consistent with the preferred damping factors. The greater the viscosity of the damping medium, of course, the greater may be the shear film spacing and thus the manufacturing tolerances in the parts providing the parallel working surfaces of the relatively oscillatably movable housing and inertia mass. Even distribution of the damping medium within the working chamber 17 is promoted by utilization of the spaces between the spokes 32 as reservoir space. For this purpose the face of the radially extending portion of the inertia member 31 which opposes the spoked portion of the disc assembly is desirably offset as shown at 34 to provide a flow gap, and the inner perimeter of the inertia member is spaced from the stepped shoulder 27, substantially as shown. Thereby equalized distribution of the damping medium is promoted for effective shear film coupling between the working surfaces of the parts.

In another desirable inertia mass spring spoke disc structure, as shown in FIGURE 3, a disc 35 is provided having an inner hub portion 37 with attachment member receiving apertures 38, an outer inertia mass margin 39 having attachment member receiving perforations 40 and a major intermediate portion subdivided into generally radially extending resilient spokes 41 separated by dead ended radially extending slots 42 having their opposite ends at the hub portion 37 and the inertia mass portion 39, respectively. By having the slots 42 extending radilly, the spokes 41 are narrowest at their inner ends and flare toward widest section at their outer ends. Additional flexibility in the spokes is attained by medially dividing the widest portions of the spokes by means of respective slots 43 into narrower, shorter spoke sections 44. This, in effect, affords integrated two-stage energy absorbing flexing in the spokes. The discs 35 may be substituted for or used in laminar relation cooperatively with the discs 22, as preferred.

In FIGURE 4 is depicted a viscous torsional vibration damper embodying substantially the same principles as the damper 10, that is, it combines a tuning spring connection of the inertia mass to the housing and a viscous damping coupling between the damping mass and the housing. In the damper 45, a one-piece flywheel, spring and hub 47 is provided which desirably comprises a suitable metal casting, such as cast iron of suitable grade, copper manganese alloy, or other desirable material such as nylon or fiberglass, consistent with performance and cost factors for particular installations. A hub flange 48 with bolt holes 49 is provided by which the member is adapted to be attached to a member subject to torsional vibrations. In this instance, a housing 50 is mounted on the inertia mass member 47 and comprises an annular generally L-shaped member having a radial wall 51, an outer axially extending wall 52, a closure disc wall member 53 parallel to the wall 51 and cooperating therewith and the wall 52 to provide a working chamber 54. At their inner margins, the wall 51 and the closure disc 53 are fixedly secured in suitable manner such as by means of bolts or rivets 55 to axially opposite ends of the hub portion of the member 47, a hermetic seal being afforded by static seals 57. A hermetically sealed joint between the outer perimeter of the disc 53 and the wall 52 is provided by a turned flange 58 on the wall 52 clamping the associated margin of the disc 53 against a shoulder 59 and securing a seal 60 in the joint. At its axially opposite ends, the major portion of the annular inertia mass member 47 is inset as shown at 61 relative to the minor hub portion of the member to provide a shear film gap relation between the working surfaces thereby provided and the confronting parallel working surfaces of the chamber walls, having regard to the viscosity of viscous damping medium substantially filling the working chamber 54. About its outer perimeter, the inertia member is also in shear film spaced relation to the parallel working surface of the housing wall 52. Resilient spokes 62, spaced from one another by slots 63, in similar manner as the spokes of the discs 22, or alternatively in similar manner as the spokes of the disc 35, connect the minor hub portion and an outer perimeter inertia portion 64 of the inertia member. Operation of the damper 45 is substantially the same as described for the damper 10.

In FIGURES 5 and 6 is depicted a damper 65 which is in general respects similar to the damper 45 but discloses a modified cantilever beam spring spoke structure. To this end, the damper comprises a ring-shaped one-piece combination inertia mass and vibration absorbing spring member 67 having a minor hub portion 68 and with a major portion thereof extending into a working chamber 69 defined by a housing 70 carried by the inertia member and comprising a member having a radial wall 71 and an axially extending wall 72 having a turned terminal flange 73 clamping against a shoulder 74 the radially outer margin of a closure disc 75 with a seal 77 hermetically sealing the joint. In this instance, the inner diameter of the hub portion 68, of the housing wall 71 and of the closure disc 75 are concentric and in lapping relation with means such as bolts or rivets 78 securing them fixedly together and with static seals such as O-rings 79 clamped in the joints and hermetically sealing the chamber 69. Aligned bolt holes 80, at suitable circumferentially spaced intervals through the laminar hub thus provided for the unit, enable attachment of the damper to a rotary member such as a crankshaft in which torsional vibrations are to be damped.

Along each of its opposite axial faces, the inertia mass member 67 radially outwardly from the hub portion 68 is inset, preferably substantially equal to the spaced relation between the perimeter of the inertia member and the wall 72, to provide a shear film spaced relationship between the confronting working surfaces of the housing and of the inertia member, having regard to the viscosity of a damping medium such as a suitable grade of silicone fluid substantially filling the available space within the chamber 69.

To afford tuned spring damping in the major portion of the inertia mass 67, an integral outer marginal inertia ring portion 81 thereof is connected by spring spokes 82 in spaced relation to the minor hub portion 68. Both the inertia portion 81 and the spokes 82, comprising the major area portion of the inertia member 67 are desirably possessed of inherent resiliency affording a substantial spring rate and determinable tuning frequency and damping factor within the principles of the invention enabling the dumper to be designed to meet various tuning requirements. To this end, each of the spokes 82 is about 90° in length with about 30° between spokes. One end of each of the spokes 82 is connected by an integral filleted generally radially outwardly extending joining portion 83 to the hub portion 68. At its opposite end each spoke is connected by integral generally radially inwardly extending filleted joining portion 84 to the inertia rim 81. From the relatively wider joining portions 83 and 84 thereof, each of the spokes 82 is of progressively thinner depth, namely, its dimension in radial direction, while remaining of the same uniform width as the inertia rim portion 81. Preferably the narrowest depth of the spoke is nearer the joint 83 than to the joint 84. Further, each of the spokes 82 joins with its respective joints 83 and 84 on as large as practicable radii, with the largest radii being, of course, along the shoulders of the junctures. Also, the construction is such that each of the spokes is of curved form with the median axis of curvature being generally involute inwardly from the joint 83 to the joint 84. A clearance space 85 between the inner edge of each of the spokes 82 and the hub portion 68 extends into an enlarged space 87 between the adjacent joints 83 and 84 of the spokes leading into respective clearances 88 between the outer edges of the spokes and the inertia rim 81. As will be observed, this also affords circumferentially symmetrically located portions along the inertia rim 81 having depths on the order of the depths of the spring spokes 82 thereby affording resiliency in the inertia rim complementary to the resiliency in the spokes so that not only do the spokes bend responsive to torsional vibrations, but the rim 81 also bends. Thereby the mass in the inertia member is utilized to a maximum for spring function, involving the lowest possible bending stresses in the material. Damping energy that must be absorbed is thus efficiently dissipated by hysteresis within the material of the damper itself without exceeding the fatigue limits of the material.

In order to avoid excessive stresses in the inertia member under transient or unusual torque conditions suitable stop means may be provided between the spokes. Conveniently such means may comprise respective travel limiting stop members 89 which may be rigid plastic flat ended cylinders of a diameter to fit freely in the respective clearance spaces 87, with the diameters of the stop members calculated to enable safe angular windup, but being engaged by and between the opposed shoulders of the junctures 83 and 84 in the predetermined windup limit. By having the length of the cylindrical stop members 89 on the order of the width of the major portion of the inertia member interference with viscous damping will be avoided and even enhanced to the extent that a viscous coupling may be present between the ends of the stops and the confronting working surfaces within the housing of the damper.

In FIGURE 7 is depicted another form of ring-shaped inertia mass and vibration absorbing spring structure 90 adapted for a tuned viscous torsional vibration damper on the order of the damper 65 and of a construction enabling it to be made as a cast iron or steel assembly. It comprises a hub ring 91 having bolt holes 92 and rivet holes 93. In its outer perimeter, the hub 91 has a series of longitudinally extending equally spaced identical slots 94 within which are engaged the circumferentially widened tip end portions 95 of radial spokes 97 integral in one piece with an inertia ring 98. In order to minimize stresses large fillet radii 99 are provided at the juncture ends of the spokes 97 with the inertia ring 98, and large radii fillets 100 are provided at juncture of the bodies of the spokes 97 with the hub-engaging widened tip end portions 95. In this construction, the resilient spokes 97 contribute to the inertia mass.

In FIGURE 8 an inertia ring structure 101 is shown which is also adapted for cast, steel or iron construction, but in this instance, a hub ring portion 102, having bolt and rivet holes 103 and 104, respectively, has integral, in one piece therewith, radially extending equally spaced spokes 105 having at their radially outer ends circumferentially widened tips 107 which are fitted into complementary transverse slots 108 in the inner perimeter of an inertia ring 109. As will be observed, the spokes 105 desirably taper from a maximum circumferential width at fillets 110 at juncture with the hub 102 to narrowest width at fillets 111 where they join the widened anchoring tips 107.

In FIGURES 9 and 10, a tuned viscous vibration damper 112 is shown including a hub 113 having a radially extending flange 114 aligned with one end and lappingly engaged by a coextensive housing flange 115, with aligned bolt holes 117 therethrough and secured together in assembly by means such as rivets 118, with a static ring seal 119 providing a seal between the lapped faces of the hub and the housing flange. Completing the housing is an exially extending annular flange 120 on the outer perimeter of the housing flange portion 115 and spaced a predetermined distance from the outer diameter of the hub 113. The housing flange 120 extends coextensively about the hub 113 and is provided with an annular rabbet groove 121 within which is engaged an outer edge on a closure ring disc 122, the inner edge of which is received within a complementary rabbet groove 123 in the adjacent end of the hub 113. The sealing and retention of the closure disc plate 122 is effected by means of respective turned over retaining flanges 124 and 125 on respectively the hub and the housing flange 120, with sealing means 127 locked in the joints between the turned flanges and the edges of the disc closure and thereby hermetically sealing an annular working chamber 128 within the hub and housing assembly and within which viscous damping fluid is contained.

For tuned damping, an inertia ring 129 has respective working faces in parallel shear film spaced relation to respective working surfaces within the chamber 128 of the housing flange 115, the housing flange 120 and the closure plate 122.

For tuning purposes, the inertia ring 129 is connected to the hub 113 by means of resilient spokes 113 comprising high strength steel, generally radially extending flat leaf spring members. Although shown as rectangular in plan form, the spring elements may be parabolic or triangular or other desirable shape. Desirably the elements of the spring spokes 130 are in plural units, in this instance shown as two of the elements for each of the spoke units. At their hub ends, the spokes 130 are anchored in respective slots 131 opening radially through the outer diameter perimeter of the hub 113 and desirably spaced apart equally. At their outer ends, the spokes 130 are engaged within radially inwardly opening slots 131 in the inertia ring 129, with the root width of each of such slots a predetermined narrower width than the spacing between the remote walls defining each alternate pair of the hub 131 and aligned with the solid area separating the pair of slots. Thereby the pair of spokes 130 aligned with each of the inertia ring slots 132 is maintained under preload tension toward its companion spoke by engagement of the outer ends of the spokes in the slot 132. This preloading of the spokes 130 assures tuning and since the springs are preloaded in opposition there is zero backlash between the inertia ring flywheel and the hub. To assist in maintaining a balanced relationship of the inertia ring 129 in the housing, radially extending locators 133 extend at suitable intervals, such as three equally spaced intervals, between the hub 113 and the flywheel ring. These indicators are rigid members of a width to afford maximum available contact with the respective surfaces of the hub and inertia member along respective line contacts afforded by desirably semicylindrical end surfaces of the locators. In thickness the locators are such as to be accommodated freely between respective pairs of the resilient spokes 130 with the respective adjacent spokes bowed generally away from the locators. By virtue of their arcuate ends, the locators maintain the relative line contact with the respective surfaces of the hub and inertia member by a rolling action in the torsional relative spring-returned action of the hub and inertia member in operation of the damper. To maintain the locators against circumferential displacement and to hold the inertia ring 129 centered in the housing and substantially against drifting axially, means such as respective pins 134 are seated in circumferentially flared sockets 135 which are of a width to receive the pins in closely slidable relation and which open from the opposite ends of the locator. From the locator sockets, the pins 134 extend into respective complementary circumferentially flared, pin width sockets 137 aligned with the ends of the locators and opening from the respective peripheral portions of the hub and inertia ring member engaged by the locator.

In order to retain the leaf spring spokes 130 against sideward displacement from the slots 131 and 132, respective retaining plates or ring disc washers 138 of a diameter to close the ends of the grooves 131 are seated in respective rabbets in the opposite ends of the hub 113.

Another damper 140 (FIG. 11) utilizing the advantageous inexpensive flat leaf spring spoke structure which permits relatively highly stressed preloading, similarly as the damper 112 comprises a hub 141 having a central attachment flange 142 and mounting a housing 143 defining a working chamber 144 within which an inertia ring member 145 has working surfaces in shear film spaced relation to confronting complementary working surfaces within the housing, having regard to the viscosity of a viscous damping medium hermetically sealed within the chamber a tuned, resilient spoke coupling between the hub 141 and the inertia member 145 is provided by leaf spring spokes 147, each of which comprises a plurality of leaf springs as a set. In this instance, the leaf spring spokes 147 have their radially outer ends substantially anchored in respective radially inwardly opening slots 148 in the inner perimeter of the inertia ring 145 and comprising respective pairs of such slots spaced apart to a predetermined greater extent than the width of radially outwardly opening and relatively medially located respective slots 149 in the opposed perimeter of the hub 141 and within which the radially inner end portions of the spokes 147 are retained under tensioned preload toward each other in each pair of spokes, whereby the spokes are respectively bowed in opposite circumferential directions relative to the damper axis in each pair to afford a well-balanced, efficient, backlash-free tuned construction. Suitable equally spaced rigid locator bars 150 substantially the same as and functioning the same as the locator bar members 133 are disposed between selected pairs of the spokes 147. Retainer disc ring plates 151 mounted in respective rabbets at the opposite ends of the hub 141 close the ends of the hub slots 149 and retain the spokes 147 against displacement in axial direction within the damper.

In FIGURE 12 is shown a damper 153 embodying the adavntageous features of generally radial leaf spring tuning spokes and affording additional inertia mass and increased viscous damping. To this end, the damper 153 comprises a pair of complementary flanged housing members 155 and 154 secured together at outer marginal edges as by means of a beam weld, and at the center of the unit having radially extending hub attachment flanges 158 and 159, respectively, clamping therebetween a radially extending anchoring flange plate 160 of a laminated ring-shaped hub 161 of which the laminations are secured together as by means of rivets 162 and which fits within the radially inner portion of an annular working chamber 163 of generally rectangular axial cross-section defined within the housing. For increasing the working surfaces within the chamber 163, the central lamina of the hub 161 is extended radially outwardly to provide a working surface plate 164 facing in respectively opposite axial directions. Between the fixed working surface plate 164 and the confronting spaced axial wall surfaces of the housing within the working chamber 163 are respective, and in this instance identical, inertia ring flywheels 165 desirably comprising a laminated construction with the outer perimeter in shear film spaced relation to the radially inwardly facing wall surface defining the housing while the respective opposite axially facing surfaces of the flywheels oppose the confronting parallel working surfaces of the housing and of the central partition or divider plate 164, respectively, in shear film spaced relation, having regard to viscous damping fluid hermetically sealed within the working chamber 163. Increased damping area confrontation between the axial faces of the inertia members 165 is attained by having the side laminations thereof extending radially inwardly to provide substantially enlarged working face area flanges 167 and with the laminations between the flanges 167 of substantially greater inside diameter to afford substantial radial space between the inner diameter of the inner portion of the respective inertia ring and the outer diameter of the hub 161 to accommodate leaf spring spokes 168 on the order of and functioning similarly as described in respect to the spokes 130 of the damper 112 and the spokes 147 of the damper 140. Suitable means such as welding or rivets 169 secure the laminations of the inertia ring members 165 together. At their respective radially inner and radially outer ends, the spokes 168 are secured in axially extending and radially opening slots 170 and 171. Displacement of the spokes 168 in the axial direction of the damper is prevented by closure of the ends of the slots 171 by the outer flange laminations 167 of the inertia ring members. One or more filler openings 172 lead into the working chamber 163 may be suitably closed hermetically by welding or the like. Fixed, unitary securement of the flanges 158, 159 and 160 may be effected by welding, rivets 173, or the like, with suitable annular seals 174 assuring hermetic sealing.

Another damper 175 (FIG. 13) of laminated plate structure comprises coextensive opposite side plates 177, hub disc plates 178 defining the radially inner diameter of an annular working chamber 179 within the housing, while the radially outer diameter of the chamber is defined by alternate spacer rings 180 and working surface increasing-fin-like annular disc rings 181, the latter projecting radially inwardly beyond the spacer rings. A built-up inertia ring member comprises alternate disc rings 182 and spacer rings 183 affording an interleaved relation with the fin rings 181 of the housing and affording large shear film spaced opposed working surfaces and working areas on the inertia ring and the housing, respectively, for high viscous damping efficiency. All of the assemblies of laminations in the housing and the inertia ring member may be suitably secured together in any desirable manner as by welding, riveting, epoxy bonding, and the like. Tuned resilient spoke connection between the hub 178 and the inertia ring is effected by means of flat leaf spring spokes 184 connected between the radially spaced members and functioning in substantially the manner described for the spokes 130 and 147 of the dampers 112 and 147, respectively. At their radially inner ends, the spokes 184 are mounted in axially extending and radially outwardly opening slots 185 in the hub assembly and at their radially outer ends, the spokes are mounted in radially inwardly opening axially extending respective slots 187 in the inertia ring assembly.

In another form of tuned viscous damper 188 (FIG. 14) utilizing flat leaf spring spokes 189 on the order of the spokes 130 and 147 and functioning in substantially like manner, the radially inner ends of the spokes are mounted in respective axially extending and radially outwardly opening slots 190 in an annular hub 191 which has intermediate its ends a radially inwardly extending hub flanges 192 engaged clampingly by and between hub flanges 193 of complementary housing shell members 194 and 195 which define with the hub 191 an annular working chamber 197 closed at the radially outer perimeter of the damper by respectively oppositely extending telescopically interengaged flanges 198 of the housing member. A hermetically sealed attachment of the hub and housing members may be effected in a suitable manner as by welding, riveting, epoxy bonding, and the like or combinations thereof. Within the radially outer portion of the working chamber 197, an annular inertia ring member 199 has working faces thereof in shear film spaced relationship to the opposing surfaces of the housing, having regard to the viscosity of damping medium in the chamber. Within its inner perimeter, the inertia ring has radially inwardly opening slots 200 within which the radially outer end portions of the spring spokes 189 are engaged for tuned mechanical damping. Displacement of the spokes 189 axially relative to the hub 191 is avoided by closure of the ends of the slots 190 by the housing members 194 and 195. Centered retention of the inertia ring 199, preventing its drifting axially is effected by means of an expansible split locking ring 201 received in central radially outwardly opening slots 202 in the spokes 189 and of a depth to receive the ring therein clear of the inner perimeter of the inertia member 199 during assembly and until the slots 202 align with a radially inwardly opening annular complementary groove 203 in the inertia member intersecting the slots 200 and into which the ring 201 expands to lock the inertia member and the spokes against relative displacement axially of the damper unit.

In the damper 204 of FIGURES 15 and 16, a different spring spoke tuning arrangement is depicted. It includes an annular hub 205 having at one end a radially inward attachment flange 207 in lapping engagement with a complementary flange 208 of a housing shell 209 defining with the hub an annular working chamber 210 closed at one axial side by a hermetically sealed annular closure plate 211, the working chamber being thoroughly hermetically sealed and having therein a viscous damping medium. Spaced from the hub 205 within the working chamber 210 is a ring-shaped inertia member 212 having its faces in shear film spaced relation to the confronting radially inwardly and axially inwardly facing surfaces of the housing for viscous damping coaction.

For tuned mechanical damping, spring spokes connect the hub 205 and the inertia ring 212, and in this instance comprise the coils of a helical spring 213 which is of a diameter desirably slightly less than the width of the inertia ring 212 but of larger diameter than the space between the confronting perimeters of the hub 205 and the inertia ring. Connection of the spoke coils of the spring 213 with the damper members is through worm-thread groove slots 214 transversely across the chamber of the hub 205 and cradling the spring coils in anchoring relation and against displacement of the spring therefrom in the axial directions of the damper. In the inner periphery of the inertia ring 212, transversely extending grooves 215 have the spoke coils of the spring engaged therein, whereby the coils are subject to torsional and bending stresses as the inertia ring oscillates angularly relative to the hub in the operation of the damper. In order to minimize frictional wear of the spring coils in the slots, a wrapping or coating 217 of a suitable friction and wear-resisting material compatible with the viscous damping fluid in the working chamber may be provided about the wire comprising the spoke spring. Centered retention of the inertia ring 212 substantially against drifting in an axial direction is effected by means of snap rings 218 which are engaged in annular grooves 219 in the inner perimeter of the inertia ring and opposing the helical spoke spring 213.

Referring now to the embodiment of the invention shown in FIGURES 17 and 18, the damper 220 includes an inertia mass 225 herein comprising a ring-shaped member which is yieldably coupled to a member to be bent which may comprise the crankshaft of an internal combustion engine. Mechanical, tuned coupling of the inertia mass to the crank shaft is through one or more, in this instance three coextensive lamina spring spoke finger plates or discs 228 provided with radially outwardly opening slots 229 and divide the radially outer marginal portion of the plates into vibration absorbing resilient spring finger spokes 230. Enclosing the inertia mass 225 and the damper plates 228 is a housing comprising differentially dimensioned annular generally L-shaped cross-section housing members 231 and 232 and an annular closure plate 233 defining a working chamber 234. For attachment of the damper unit to the shaft 227, a hub is provided by concentric, aligned radially extending inner flange portions 235 and 237 on respectively the housing members 231 and 232 and secured together as by means of rivets 238. Suitable bolt holes 239 accommodate securing bolts 240 by which the damper is secured to he shaft 227. Concentricity with the shaft 227 is promoted by reception within a central hub bore 241 of an axial stepped boss 242 on the end of the shaft.

Concentric integral coextensive axiallly extending annular, differential diameter flanges 243 and 244 on respectively the housing members 231 and 232 define the radially outer and radially inner walls of the chamber 234. A hermetically sealed attachment of the rim of the closure plate 233 to the edges of the housing flanges 243 and 244 may be effected as by means of rolled-over retaining flange lips 245 on the housing flanges, with respective seals 247 in the joints. The axially opposite walls of the chamber 234 are thus provided by the housing member 231 and by the plate 233.

Although if preferred a single thicker plate 228 might be employed, for tuning efficiency and versatility and manufacturing enonomy, a plurality of the tuning spring bolt plates 228 are employed, especially for larger damper sizes. For example, for use in a damper having about an 8½ inch outside diameter, such as may be used on a 6 or 8 cylinder diesel engine, each of the spoke spring plates 228 may be made as a stamping from suitable grade steel of about .032 inch thickness and adequate spring characteristics such as SAE 1095 material. As many of the plates 228 as calculated to be desirable may be used in laminar, aligned concentric relation, three being shown in the illustrated example. Desirably, the plates 228 are bonded together in the laminated structure by suitable means such as an epoxy adhesive 248. On their inner marginal portions, the plates 228 afford generally solid hubs coextensive with the hub provided by the housing member flanges 235 and 237, the assembly being bonded together by means such as an epoxy resin adhesive 249. Suitable rivet holes 250 through the hub portions of the plates 228 pass the rivets 248, and bolt holes 251 through the plate hub accommodate the bolts 240. To facilitate assembly, the spoke finger plate laminate may be initially secured to the hub flange 235 by means of one or more taking screws or pins. As a result, the hub portion of the spring spoke plates 228 are anchored as a unit fixedly to the housing.

Clearance for the spoke fingers 230 is afforded by a recess 253 inset in the inner side of the wall of the housing member 231, and the inertia member 225 is provided with an axially extending relatively narrow annular outer marginal flange 254 which projects into the inset recess and has a radially inwardly opening groove 255 within which the spring finger tips are engaged. To facilitate assembly of the spring finger spoke tips in the groove 255, the plates 228 may be constructed segmentally. Within the groove 255, the spoke tip portions are firmly anchored as by means of welding or by suitable potting material such as an epoxy or other resin 257 which will bond thoroughly to the tip portions and the walls defining the groove. To facilitate such bonding, the tip extremities of the spokes 230 are preferably rounded as shown at 258. Through this arrangement the inertia member 225 is elastically mechanically coupled to the housing. The spokes 230 provide cantilever type springs with high spring resitivity. Bending strains and compression loads are avoided on the tuning spokes 230 by having the inertia ring member 225 ride on an annular bearing 259, desirably associated with the inner circumference of the inertia ring.

A viscous coupling damping fluid such as silicone substantially fills the working spaces in the work chamber 234, including a reservoir space 260 between the inner periphery of the inertia ring and the housing flange 244 and a space between the inertia ring and the inset recess 253, with the slots 229 between the spokes 230 affording ample equalization flow passages. Viscous damping results from the outer periphery of the inertia member 225 and the annular confronting surface of the housing flange 243, as well as the axially facing surface of the inertia ring and the closure disc 233, and the axially facing annular surface of the inertia member marginal flange 254 and the opposing housing defining surface of the member 231 being in shear film spaced relation with respect to the viscosity of the coupling fluid. In addition to the hermetic seals 247, annular hermetic seal rings 261 are desirably provided between the hub flanges 235 and 237 and the hub portions of the tuning spring spoke laminate, thereby completely hermetically sealing the working chamber 234.

Tuning of the damper 220 can be readily calculated and accommodated by a predetermined number of the spring spoke plates 228. Substantial reduction in size and weight of damper is enabled for handling vibration damping requirements previously necessitating larger and heavier dampers. For example, by tuning the damper 220 to control the third order of torsional excitation for a six cylinder engine, or the fourth order excitation in an eight cylinder engine, it has been found that a damper of about 8½ inches outside diameter will serve the purpose that a pure viscous damper of ten or twelve inches in outside diameter would handle. This saves inertia or weight as well as space and reduces the required damper envelope or housing needed.

In FIGURE 19 a schematic or analog representation of a damper according to the principles of the present invention as applied to an engine is depicted. The engine plus damper housing inertia is represented by the box 262. Engine stiffness is represented by the symbol 263. The viscous coupling is represented by the symbol 264. The mechanical, resilient spoke tuning coupling is represented by the symbol 265. The inertia member in the system is represented by the symbol IM.

In all forms of the invention, the combined advantages of mechanical tuning and viscous damping are attained in a damper having the service lift expectancy of an untuned viscous damper. The inertia mass is mounted on and in relation to the spokes in balanced relation to the housing. The tuned damper of this invention has considerably higher damping capability for its size and weight than an untuned viscous damper and because of the smaller size is adapted for use, in some instances, on engines which otherwise could not be equipped with a damper. All external dynamic seals are avoided and the damper is built as a hermetically sealed assembly.

It will be understood that variations and modifications may be effected without departing from the spirit of the novel concepts of this invention.

I claim as my invention:

1. A tuned viscous vibration damper comprising, in combination:
   housing means defining a working chamber;
   an inertia mass relatively movable in said chamber;
   a viscous damping medium in said working chamber;
   said inertia mass and said housing means having confronting working surfaces viscously coupled by said damping medium; and
   resilient tuning spokes connecting said inertia mass and said housing means.

2. A damper as defined in claim 1, in which said spaces between said spokes provide reservoir space for said damping medium.

3. A damper as defined in claim 1, especially suitable for damping torsional vibrations, and including a hub structure and means for securing the hub structure coaxially with a member subject to torsional vibrations to be damped, said inertia mas comprising a ring-shaped structure substantially spaced concentrically about said hub structure, said spokes being attached at one of their ends to said hub structure and at their opposite ends to said inertia mass.

4. A damper as defined in claim 3, in which said inertia mass and said housing means within the working chamber have circumferential and axially facing confronting working surfaces in shear film spaced relation having regard to the viscosity of the damping medium.

5. A damper as defined in claim 3, in which said spokes are on annular discs in laminar stacked assembly having radially inner margins secured to the hub structure and with said spokes extending from said inner margins and connected to the inertia ring means.

6. A damper as defined in claim 5, in which one of said laminar discs provides a working surface confronting working surface area of the housing within said chamber.

7. A damper as defined in claim 3, in which at least a part of said hub structure, said spokes, and said inertia ring mass are formed integrally in one piece.

8. A damper as defined in claim 3, in which said spokes have generally involute median axes.

9. A damper as defined in claim 3, in which said spokes are three in number extending generally in a circumferential direction through about 90° and are spaced apart at their adjacent ends about 30°, each of the spokes having a generally radial juncture at one end with said hub structure and having a substantially radial juncture at its opposite end with said inertia mass ring, and the spokes being otherwise spaced from said hub structure and said inertia mass ring.

10. A damper as defined in claim 9, in which the junctures of adjacent spokes have substantial spaces therebetween and define opposed shoulders, and respective stop members normally in clearance relation between said shoulders and limiting wind-up travel of the inertia mass ring as permitted by the resilience of said spokes to avoid developing damaging stresses under transient or unusual torque conditions.

11. A damper as defined in claim 3, in which said housing means comprise a casing engaging said hub structure.

12. A damper as defined in claim 3, in which said spokes extend generally radially about the axis of the hub structure.

13. A damper as defined in claim 12, in which said inertia mass ring, said spokes and said hub structure are integral in one piece.

14. A damper as defined in claim 12, in which said spokes are formed integrally in one piece with said inertia mass ring, and said hub structure comprises a member having a perimeter spaced from said inertia mass ring and has ring slots therein within which radially inner end portions of the spokes are engaged.

15. A damper as defined in claim 12, in which said spokes are integral in one piece with said hub structure, and said inertia mass ring has an inner periphery provided with slots within which the spokes have radially outer end portions thereof engaged.

16. A damper as defined in claim 12, in which said spokes are leaf springs, and said inertia ring mass and said hub structure have respective slots therein within which respective opposite end portions of the leaf spring spokes are engaged.

17. A damper as defined in claim 16, in which said spokes are under preloaded tension.

18. A damper as defined in claim 17, in which said spokes are preloaded in alternatley opposite circumferentially tensioned relation whereby to eliminate torsional backlash in the oscillations of the inertia ring mass.

19. A damper as defined in claim 16, including means to maintain the spokes against displacement along the lengths of the slots in said hub structure.

20. A damper as defined in claim 19, including means interconnecting the spokes and the inertia ring mass so that the spokes hold the inertia ring mass against axial drifting within the housing.

21. A damper as defined in claim 16, in which said spokes comprise coils of a helical spring.

22. In a vibration damper of the character described:
an inertia mass; and
means for yieldably coupling said mass to an object subject to vibrations to be damped, comprising a plate having a marginal portion secured to said mass and an opposite marginal portion to be secured fixedly to said object, and an area of substantial width of the plate between said margins free and slotted and thereby subdivided into a plurality of vibration absorbing spring fingers which extend on axes intersecting said margins.

23. A vibration damper as defined in claim 22, including a hermetically sealed housing enclosing said inertia mass and said plate, a viscous damping fluid in said housing, said inertia mass and said housing having parallel opposed working surfaces in shear film spaced relation with respect to said damping coupling fluid to afford a viscous damping coupling between the housing and the inertia mass, said opposite marginal portion of the plate being fixedly secured to the housing and said inertia mass being free for relative inertial movement when in the housing, except for said yieldable coupling through said fingers serving as spokes.

24. A vibration damper as defined in claim 23, in which said housing defines an annular working chamber, said inertia mass comprises a ring member, bearing means relatively rotatably mounting said inertia ring member in the housing, said plate being in circular arrangement and having the spring finger spokes extending radially outwardly and secured at thier tips to said inertia ring member, said opposite marginal portion of the plate extending radially inwardly beyond the inner diameter of the inertia ring member and providing a hub structure, said housing having a hub structure engaging said hub structure of the plate, and means securing said hub structures fixedly together.

References Cited

UNITED STATES PATENTS

| | | | |
|---|---|---|---|
| 1,228,215 | 5/1917 | Junkers | 188—90 |
| 2,614,896 | 10/1952 | Pierce. | |
| 2,775,317 | 12/1956 | Sinisterra | 188—90 |
| 3,101,979 | 8/1963 | Mard. | |

FOREIGN PATENTS 828,354   2/1960   Great Britain.

ARTHUR L. LA POINT, Primary Examiner

HOWARD BELTRAN, Assistant Examiner

U.S. Cl. X.R.

188—90; 267—57.1